C. A. AND G. E. KRANTZ.
WATER OPERATED VENTILATOR FOR TOILETS.
APPLICATION FILED JULY 7, 1919.
1,381,710.
Patented June 14, 1921.
4 SHEETS—SHEET 3.
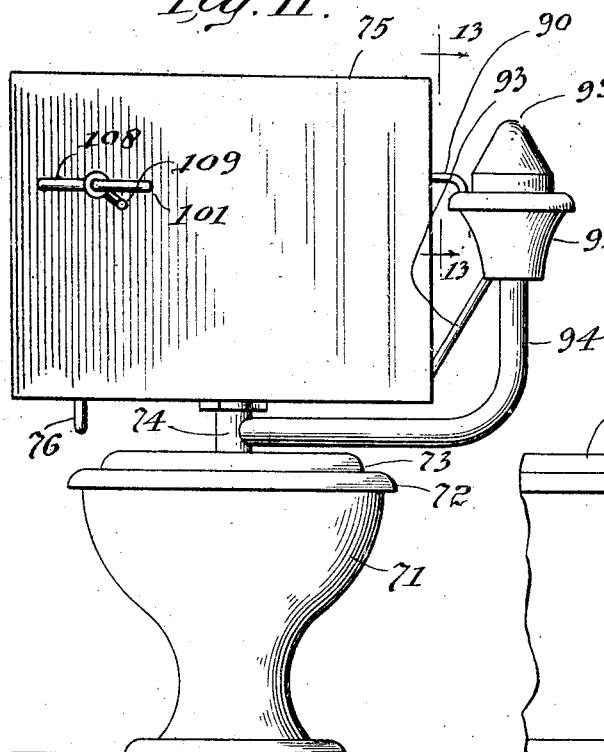
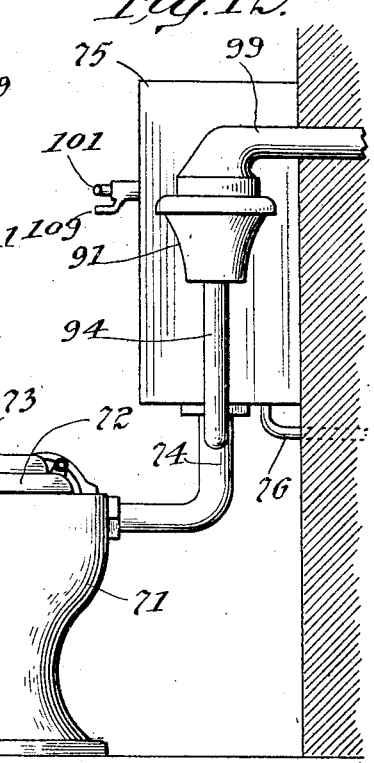
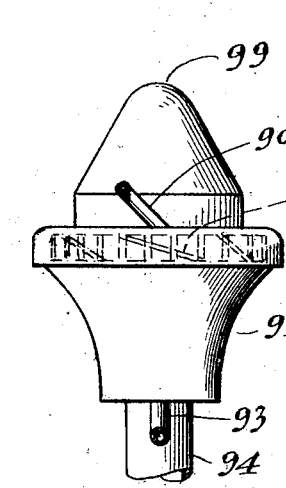
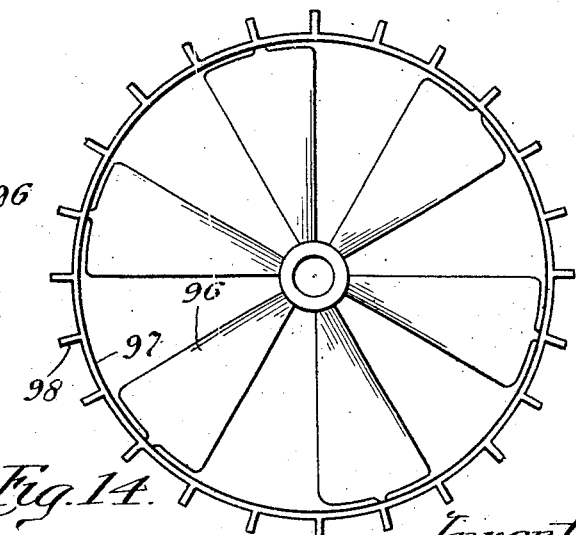
Inventors
Carl A Krantz
Gustavus E. Krantz

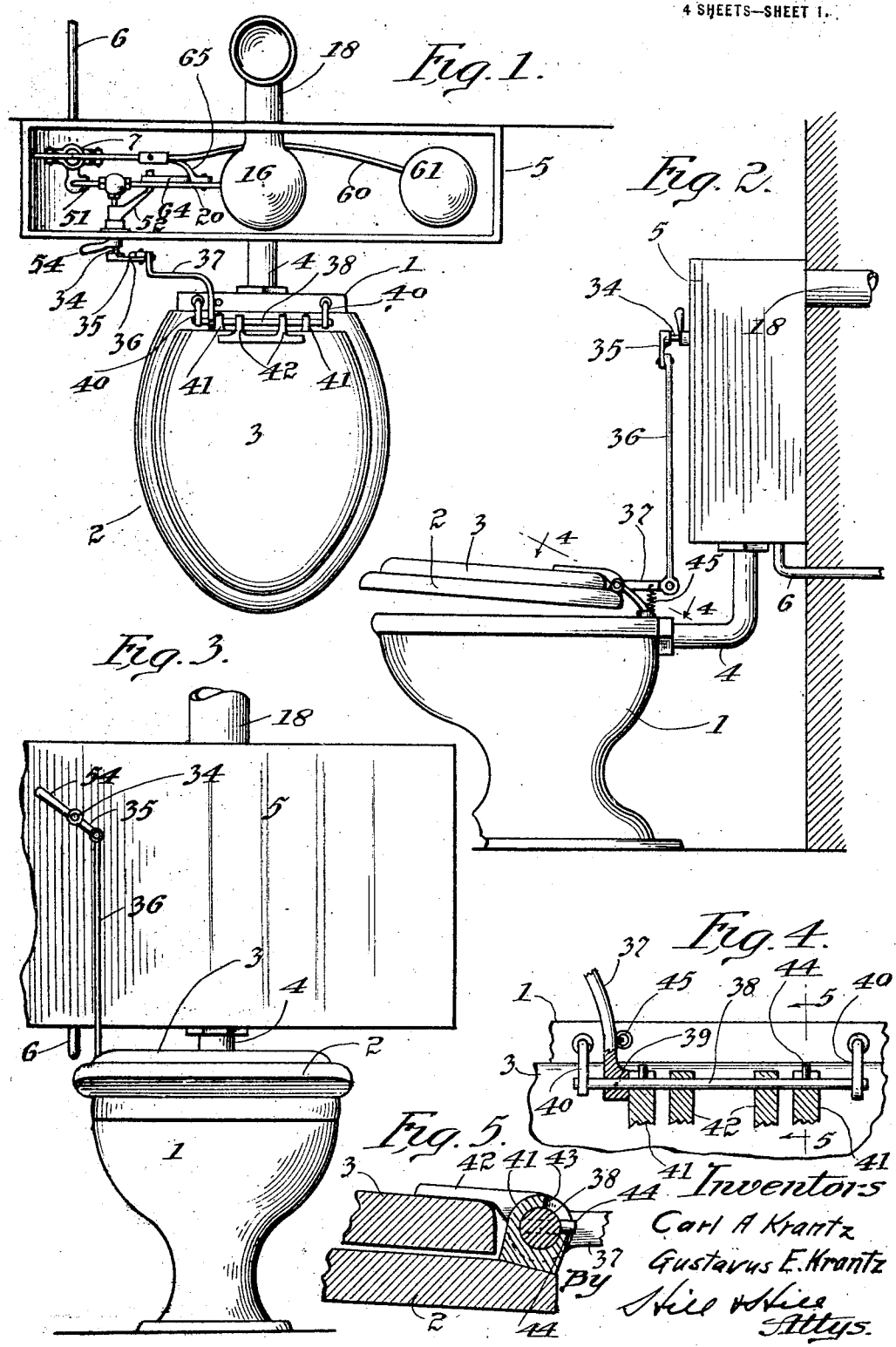

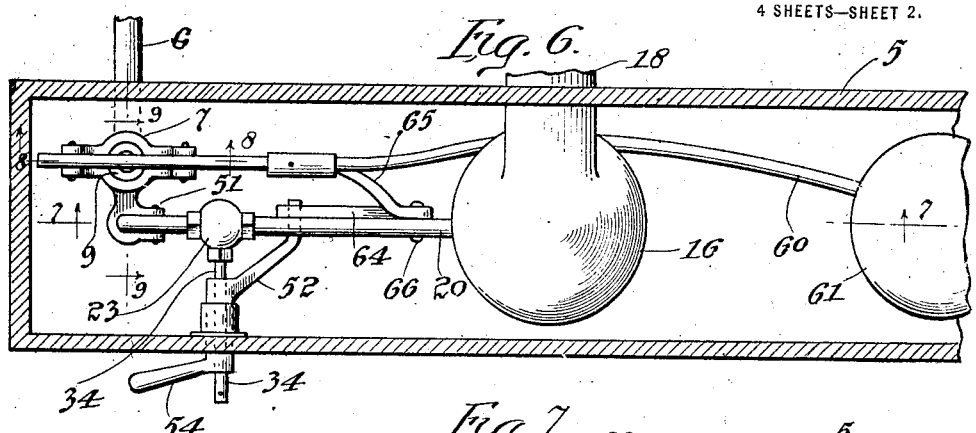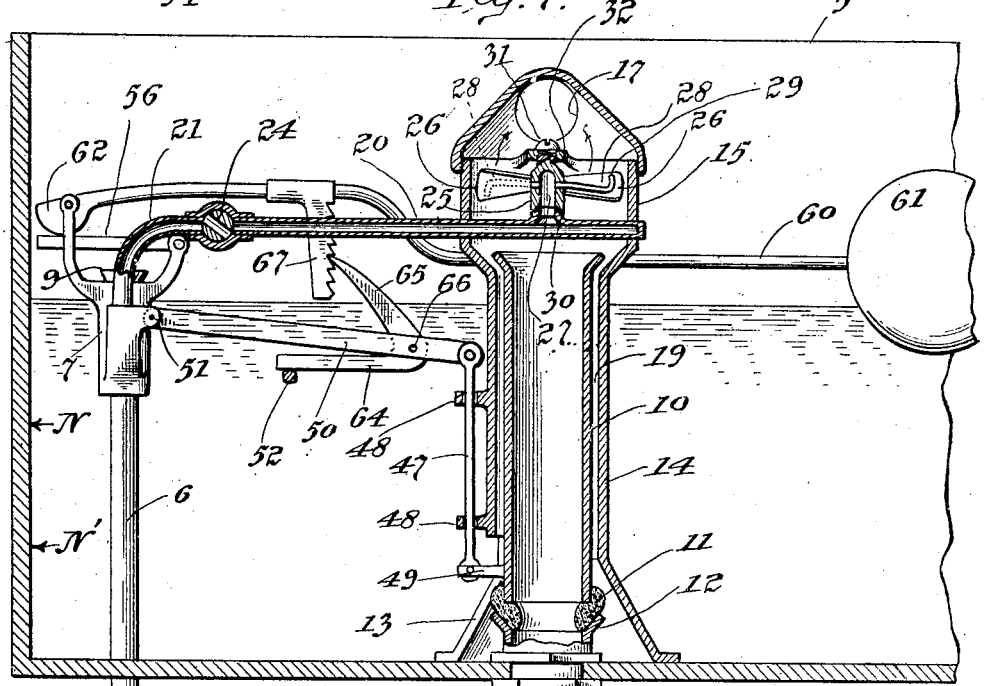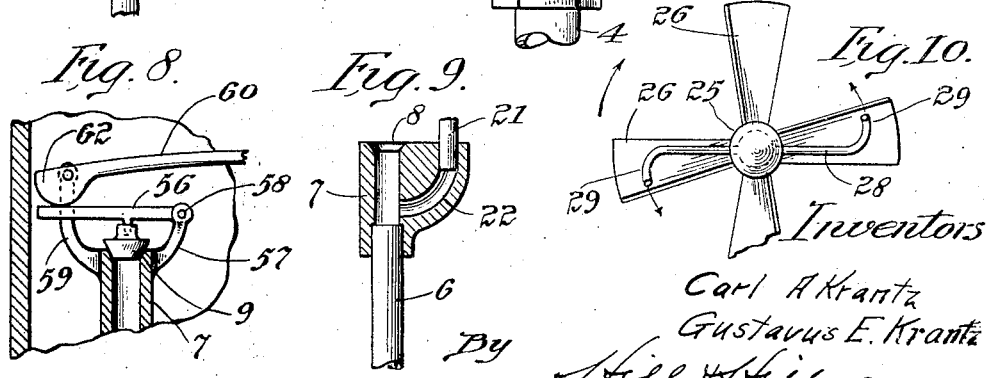

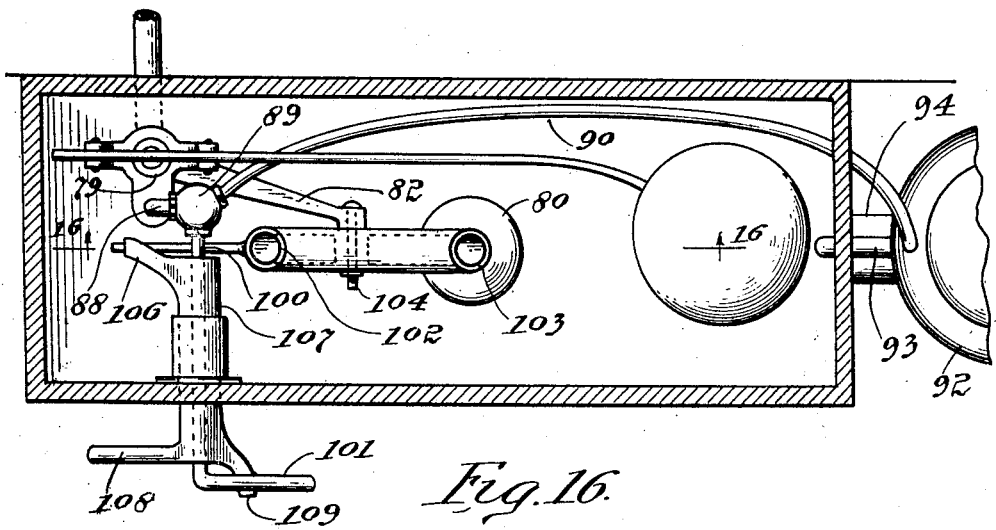
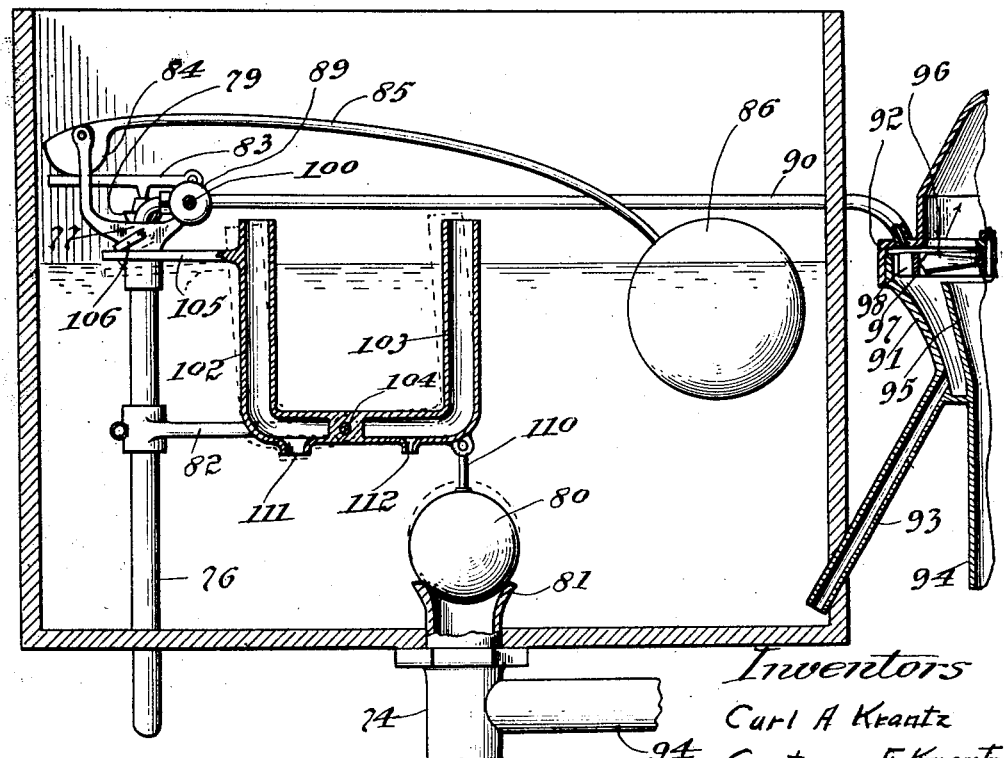

UNITED STATES PATENT OFFICE.

CARL A. KRANTZ AND GUSTAVUS E. KRANTZ, OF CHICAGO, ILLINOIS.

WATER-OPERATED VENTILATOR FOR TOILETS.

1,381,710.     Specification of Letters Patent.     Patented June 14, 1921.

Application filed July 7, 1919. Serial No. 309,123.

*To all whom it may concern:*

Be it known that we, CARL A. KRANTZ, a citizen of the United States, and GUSTAVUS E. KRANTZ, a subject of the King of Sweden, (but first papers to become a citizen of the United States taken out,) residing at Chicago, in the county of Cook and State of Illinois, have jointly invented certain new and useful Improvements in Water-Operated Ventilators for Toilets, of which the following is a description.

Our invention belongs to that general class of devices known as toilets, and relates particularly to a water operated ventilator to be used in connection with toilets. The invention has among its objects the production of a device of the kind described that is simple, efficient, durable, compact, convenient, sanitary and economical in the use of water. More especially it relates to water driven ventilators which may be operated automatically or manually as desired, and in which there will normally be no waste of water. The invention has among its further objects the production of a device of the kind described in which the water discharged from the supply tank will normally be a measured amount, and a portion or all of the water used to operate the ventilator be included in the amount discharged for flushing purposes. Many other objects and advantages of the construction herein shown and described will be obvious to those skilled in the art from the disclosure herein given.

To this end our invention consists in the novel construction, arrangement and combination of parts herein shown and described, and more particularly pointed out in the claims.

In the drawings, wherein like reference characters indicate like or corresponding parts, Figure 1 is a plan view of one form of our device with the storage receptacle cover removed;

Fig. 2 is a side elevation of the same;

Fig. 3 is a front elevation;

Fig. 4 is a sectional view taken substantially on line 4—4 of Fig. 2;

Fig. 5 is a sectional view taken substantially on line 5—5 of Fig. 4;

Fig. 6 is a plan view of a portion of the water container;

Fig. 7 is a sectional view taken substantially on line 7—7 of Fig. 6;

Fig. 8 is a sectional view taken substantially on line 8—8 of Fig. 6;

Fig. 9 is a sectional view taken substantially on line 9—9 of Fig. 6;

Fig. 10 is a plan view of one form of jet driven ventilator fan;

Fig. 11 is a front elevation of a modified construction of toilet;

Fig. 12 is a side elevation of the same;

Fig. 13 is a sectional view taken substantially on line 13—13 of Fig. 11;

Fig. 14 is a plan view of a modified form of fan;

Fig. 15 is a plan view of the controlling mechanism; and

Fig. 16 is a sectional view taken substantially on line 16—16 of Fig. 15.

Referring to the drawings, and particularly Figs. 1 to 10, 1 represents a toilet bowl of the usual or any preferred construction provided with the usual seat 2 and cover 3, or their equivalent. The flushing water is discharged through pipe 4 from the tank 5 into the bowl 1, 6 representing the water intake pipe for replenishing the water in the tank 5. In the construction shown, the intake pipe 6 extends up into the tank and is provided with a suitable part 7 formed with a valve seat 8 arranged to coöperate with the valve 9. The discharge of water from the tank 5 is controlled by a valve 10 in the construction shown, which may be provided with a suitably formed end 11 arranged to coöperate with the valve seat 12. Valve 10 is arranged within a tubular casing 14 which is preferably open at a suitable point on the base as at 13 to permit the passage of water about the valve and into the discharge pipe 4 when the valve member 10 is raised.

As shown, the casing part 14 is provided with an enlarged upper end 15 which may be termed the fan casing, and is provided with a suitable cap 16 or its equivalent, having a discharge opening 17 communicating with a discharge pipe 18. It will be noted by referring to Fig. 7 that the casing 14 is of sufficient space to allow a space 19 between the valve and casing, the purpose of this being more fully explained hereafter.

Extending from the intake pipe 6 to the part 15 is a pipe 20—21. As shown in Fig. 9, pipe 21 is connected to part 7 and through the duct 22 communicates with the pipe 6. Arranged between pipes 20 and 21 is a valve 24, the same being arranged within the valve casing 23. Arranged within the casing 15 is a tubular part 25 constituting a hub for the fan blades 26, of which there may be any desired number. The hub 25 is chambered as at 27, the chamber communicating with the pipes 28 which are preferably formed as at 29, so as to form a jet motor for the fan. Obviously as water is discharged from the ends of 29 in the direction indicated by the arrows in Fig. 10, the fan is turned in the direction indicated by the large arrow at the left of Fig. 10. As shown, the hub 25 is mounted on a bearing 30 formed in the pipe 20, and the same is arranged to coöperate with the adjustable bearing part 31 arranged in the cross bar 32 carried by the casing. When the valve 24 is opened, water will flow through pipes 21 and 20 into the hub 25, passing through the chamber 27 and pipes 28, will drive the fan. The valve 24 may be controlled in any suitable manner, in the construction shown the same being arranged to be automatically controlled by the seat 2, that is opened, when the seat 2 is occupied. Referring particularly to Figs. 2, 4 and 6, valve 24 is provided with a stem 34 which projects to the exterior of the water container or tank 5. On the outer end of the stem 34 is arranged an arm 35 which is connected by the rod 36 with an arm 37 secured on a shaft 38 by means of a pin 39 or equivalent means for the purpose. The shaft 38 is shown mounted in suitable brackets 40, and the seat 2 and cover 3 secured to the shaft 38 by the hinge members 41 and 42 respectively. The cover 3 may be raised or lowered without affecting shaft 38, and seat 2 may be raised without affecting shaft 38. Means, however, is provided for normally maintaining the seat 20 raised as indicated in Figs. 2 and 3, the construction being such that when the seat 2 is occupied the same is depressed, thereby actuating valve 24. As most clearly shown in Figs. 4 and 5, the hinge part 41 is partially cut away at 43 and a pin 44 extended through the same into the shaft 38. Referring to Fig. 5, it will be noted that the seat may be raised without operating the pin 44, but the seat is depressed from substantially the position shown and will have a tendency to rock the shaft 38 through the pin 44, thereby raising arm 37, connecting rod 36, arm 35 and shaft 34. A spring 45 or equivalent means may be provided for actuating arm 37 to close the valve and partially raise the seat when the same is not occupied.

Referring now to Fig. 7, a rod 47, carried by the brackets 48 on the casing 14, is connected by the extending part 49 to the valve 10. Rod 47 is connected to a bar 50 which is pivotally supported at the opposite end, as at 51, in any suitable manner. Arranged to coöperate with bar 50 and raise the same when it is desired to operate the valve and flush the bowl 1, is an arm 52 which is shown loosely arranged on the shaft or stem 34, and connected with an operating handle 54 at the exterior of the tank.

Admission of water to the tank 5 from the intake pipe 6 is controlled by the valve 9 as previously mentioned. As shown, valve 9 is carried by an arm 56 pivotally supported at 58 from the bracket 57, the same being arranged to coöperate with the end 62 of an arm 60, which is pivotally carried from the bracket 59 or its equivalent. The arm 60 is provided with a suitable float 61 at its free end. It may be mentioned that the end 62 is formed cam-shaped so that the float during a portion of its upward travel will close the valve 9, and during further travel merely maintain the same shut. As shown in Fig. 7, the arm or bar 50 carries a member 64—65 pivotally secured thereto at 66, the same being arranged to coöperate with the toothed member 67 carried by the float stem 60, and with the extending arm 52 controlling the flushing of the tank.

The operation of this type of device may be briefly described as follows: Assuming that there is water in the tank as indicated in Fig. 7, the normal level of the same is ordinarily at the point marked N. The valve 10 is closed, as is also valve 9, and the float is in such position that the end 62 of the stem 60 maintains the valve closed, and yet the float may rise without injury to the valve 9. The valve 24 is substantially as shown in Fig. 7, so that the fan is not operated. Upon the seat 2 being occupied, the same is depressed, and through the mechanism described the stem or shaft 34 is operated, opening the valve 24 so that water is admitted into the pipe 20, up through the fan hub chamber 27, and out through 28—29, causing the fan to be rotated. Air is circulated then from the bowl 1 to which it may be admitted between the seat 2 and the bowl, and the same is drawn up through pipe 4 up through the center of valve 10, and is discharged through pipe 18 to any desired point at the exterior of the building or where desired. As the water is discharged from the jet tubes 28 and 29, the same ordinarily runs down the walls to the fan chamber, and through the space 19 from whence it may escape through the opening 13 into the tank, so that none is wasted for at least a period of time. However, as the same flows into the tank, the level of water therein is raised, this of course raising the float 61, but owing to the fact that the last operation of the end 62 is in the form of a circle or cylindrical, valve 9 is still maintained shut. Should the seat 2 be occupied a sufficient time so that the water rises in the tank to a point above the upper end of valve 10, the same will flow through the valve and pipe 4 into the bowl. However, the amount of water thus discharged is not sufficient to shut off the current of air.

It will be noted that as the float 61 is raised, member 67 carried by the stem 60 is also raised so that the arm 65, which is substantially a pawl, engages a different tooth on the member 67. The purpose of this will be explained hereafter. Assuming that it is desired to flush the bowl, the lever 54 is operated or depressed, raising the arm 52 which throws pawl 65 out of engagement with the member 67 and raises the link 50, thereby raising the valve 10 and permitting the discharge of water past the valve at its lower end into the discharge pipe 4 and into the bowl. The flow of water is ordinarily sufficient to cause the valve 10 to be supported as the water is discharged into the bowl. Of course as soon as the seat 3 is unoccupied, the same takes the position substantially shown in Fig. 2, and valve 24 is shut substantially as shown in Fig. 7, shutting off the fan. However, at all times up to the leaving the seat, the fan has operated, thereby causing a circulation of air and removing all odors.

As the water flows from the tank, the float 61 of course descends, and as soon as the same has descended enough so that the member 62 does not exert pressure on the arm 56, the pressure of water in the pipe 6 will open valve 9. Of course the level of water in the tank, owing to the opening of valve 10, is below the normal. For example, the same may be down to a point marked N', which point will vary with the time at which the valve 10 is opened, as the amount of water discharged from the fan motor into the tank varies with the time the seat is occupied. The amount of water discharged from the tank, however, is substantially a constant amount. This is controlled by the float and member 64—65. It will be obvious that when the pawl 65 is thrown out of engagement with the teeth on member 67, the same will be free to engage again therewith as soon as the handle 54 is released. The particular engaging point, however, will depend upon the position of the float 61. At this time valve 10 is opened for the discharge of water, and as float 61 descends, the same will move pawl 65 which has been reëngaged with member 67, and shut the valve 10 when the float reaches a certain point, depending on level and tooth engaged. This particular point, however, will vary with the engaging point on member 67, and the particular point engaged will depend upon the amount of water in the tank controlling the location of the float at the time the bowl was flushed. Obviously after the flushing of the bowl and shutting of valve 10, the level of the water in the tank rises until such point as the float has closed the valve 9, shutting off the supply of water. The operation is thereafter continued in the same manner.

In the form of device shown in Figs. 11 to 16, 71 represents a bowl, 72 the seat and 73 the cover. The bowl 71 is connected by the flushing pipe 74 with the water tank 75, to which extends the intake pipe 76. Arranged in the upper end of the intake pipe is a part 77, at the outlet of which is a valve 79 similar to valve 9 in the construction previously described. The discharge of water from the flushing pipe 74 is controlled by the valve 80 arranged to coöperate with the valve seat 81. The valve 79 is carried by the lever 83 arranged to be controlled by the member 84 on stem 85, at the free end of which is the float 86. Extending from part 77 is a pipe 88, which connects with the valve casing 89, this being connected by means of pipe 90 with a fan casing 91 having a top 92, the fan casing in this case being without the tank. A pipe 93 connects the casing 91 with the tank and permits the water used for operating the fan to return to the tank under ordinary circumstances. Extending from the flushing pipe 74 is the air pipe 94, the same preferably terminating as at 95 shown in Fig. 16. Arranged within the fan casing is a fan 96, the same being suitably supported, and in the construction shown consists of the blades 96 provided with a rim or ring 97 to which are secured the blades 98, the arrangement being such that the water is discharged through pipe 90 into the fan casing, it will strike the blades and drive the fan, the water thence flowing through pipe 93 back to the receptacle under ordinary circumstances. The upper part of the fan casing 92 is provided with an air discharge pipe 99 extending to where desired.

As shown in Fig. 15, a valve stem 100 (the valve not being shown in detail) extends from the valve casing 89 to the exterior of the tank and terminates in an operating handle 101. Arranged within the tank, as shown, carried by the bracket 82, is a member consisting of the tubular parts 102 and 103, which are pivotally supported at 104. One of the parts, as shown 102, is provided with a part 105 arranged to coöperate with an arm 106 on the tubular shaft 107 extending to the exterior of the tank. The shaft 107 is provided with an operating arm 108, and with an arm 109 arranged to coöperate with the handle or arm 101, as will be more fully explained hereafter. As shown, the float 80 is connected to the parts 102—103 by connecting member 110. The two members 102 and 103 are provided with openings 111 and 112 from the exterior thereof, and it will be noted that these are not of the same size.

The operation of this form of device may be briefly described as follows, it being understood that this device is operated manually as desired and not automatically. Upon occupying the seat 72, or at such time as desired, lever 101 is depressed, thereby opening the valve in casing 89 and permitting water to flow from the discharge pipe 76 through pipe 90 to operate the fan, thereby causing a circulation of air from below through flushing pipe 74, pipe 94, past the fan and out through pipe 99. The water will flow from the fan casing through pipe 93 back to the tank until such time as the same reaches a level where the water will flow over the top of the projecting part 95, and through pipes 94 and 74 into the bowl. Ordinarily the water in the tank does not reach this height. When it is desired to flush the bowl, handle 108 is operated, thereby depressing member 105, rocking members 102—103 on the pivotal support 104, and raising the valve 80. It will be noted, however, that at this time the arm 109 raises arm 101 to shut off the flow of water to the fan, leaving the same ready for the next operation. As the water flows from the tank through the flushing pipe 74, float 86 drops, opening valve 79 and permitting additional water to flow into the tank. As the water level drops in the tank, water escapes through the openings 111 and 112. However, it will be noted that it will escape faster from side 102, owing to the fact that the hole 111 is larger. The parts being thrown out of balance, the water in 103 will tend to throw the device so as to raise arm 105, and at the same time lower the valve 80 on its seat 81.

It will be noted that with either of the constructions described, the water used for driving the water motor is normally not wasted. The only time the water is wasted is when the motor is operated for a considerable length of time, in which case the spent water entering the tank causes the tank to overflow as described. It will also be noted that the apparatus described requires no changes or modification in the toilet bowl itself.

We have described our invention as applied to a toilet or closet of a common type. It may be mentioned, however, that the same is not confined to that particular type of closet, but may be used wherever found applicable or desirable to carry off offensive odors. The same may be used wherever the water for driving the fan is obtainable. The water may be discharged into a storage tank and afterward used for any particular purpose, and not necessarily for the flushing of a toilet.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

1. In a toilet of the kind described and in combination, a bowl, a flushing tank therefor provided with an inlet and with an outlet into said bowl, a valve for controlling the admission of water through said inlet and a valve for controlling the discharge of water through said outlet, and a single coöperating mechanism for controlling both of said valves, whereby a measured amount of the water will remain in said tank after discharge, and means for ventilating said bowl including a fan, a water motor for driving said fan and receiving its operating liquid from said inlet, said motor arranged to discharge the spent water into the said tank.

2. In a ventilating device for water closets and in combination with the bowl, seat, flush pipe and storage tank, a conduit connected with the flush pipe, a casing formed by a section of said conduit, a fan arranged in said casing, water driven means for actuating said fan, means for conducting water to said water driven means, means for discharging the spent water to the storage tank, and means coöperating with said seat for controlling the water for driving said fan, and means for maintaining a substantially normal level of water in the storage tank after the flushing of the bowl and prior to the operation of the fan at a succeeding use of the toilet.

3. A ventilating apparatus of the kind described for toilet bowls having a flushing water tank, comprising a conduit suitably connected with the toilet and provided with a discharge outlet substantially remote therefrom, a ventilating fan arranged in said conduit, a water motor for driving said fan, a source of supply of water for operating said motor, said conduit provided with means for discharging the spent water into the flush tank, means for admitting sufficient water to the tank after the discharge of water therefrom to reach a normal level.

4. In a toilet of the kind described and in combination, a toilet bowl and a flushing water tank, a flush pipe connecting said tank and bowl and constituting an outlet from said tank, an intake pipe extending into said tank, valves for said inlet and outlet, means for normally controlling the inlet valve, whereby water is normally admitted through said intake pipe sufficient to reach a normal level, ventilating apparatus including a water driven fan, said apparatus arranged for the discharge into the tank of the spent water after driving said fan into the tank, and means coöperating with the valve mechanism whereby after discharge of the water in the tank, said spent water is thereafter admitted to the tank to fill it to a normal level.

5. In a ventilating device for water closets and in combination with a bowl, a flushing water tank having an intake pipe and a flush pipe extended to the bowl, a conduit arranged to receive air from said bowl through said flush pipe and constructed with an enlarged section, a fan arranged in said section, water driven means for driving said fan, means for conducting water to the fan from said intake pipe and means for directing the water back to the flushing tank, a valve arranged to control the discharge of water from the tank into said flush pipe, a valve arranged to control the admission of water into the tank from said intake pipe, and controlling mechanism for said valves, whereby a measured quantity of water is discharged into the flush pipe from the tank, and thereafter sufficient water admitted to the tank from said water driven means to reach a normal level.

6. In a device of the kind described and in combination, a toilet bowl, a flushing water storage tank provided with an inlet and with an outlet communicating with said bowl, a valve arranged to control the admission of water through said inlet, a float arranged to control said valve to admit a volume of water to the tank sufficient to reach a normal level, a valve for controlling the discharge of water from the tank into said bowl, a ventilating fan, a conduit formed with an enlarged section constituting a casing for said fan, said conduit having an inlet communicating with the bowl inlet and with a discharge port, water actuated mechanism in said casing for driving said fan, means for discharging water to said mechanism to operate the same and means for discharging the spent water into the tank, and means dependent upon the amount of spent water discharged into the tank for controlling said tank outlet valve, whereby a measured amount of water is discharged to the bowl through said outlet from said tank.

7. In a device of the kind described and in combination, a toilet bowl, a flushing water storage tank provided with an inlet and with an outlet communicating with said bowl, a valve arranged to control the admission of water through said inlet, a float arranged to control said valve to admit a volume of water to the tank sufficient to reach a normal level and thereafter maintain the valve shut, a valve for controlling the discharge of water from the tank into said bowl, a ventilating fan, a conduit formed with an enlarged section constituting a casing for said fan, said conduit having an inlet communicating with the bowl inlet and with a discharge port, water actuated mechanism in said casing for driving said fan, means for discharging water to said mechanism to operate the same and means for discharging the spent water into the tank, and means coöperating with the float and dependent upon the amount of spent water discharged into the tank for controlling said tank outlet valve, whereby a measured amount of water is discharged to the bowl through said outlet from said tank.

8. In an apparatus of the kind described including a bowl, a flushing water supply tank communicating therewith and in combination, an intake pipe extending into said tank, a valve arranged to control the admission of water through said pipe, means for controlling said valve whereby after the discharge of water from the tank into the bowl a measured amount of water will be admitted to the tank to maintain the same at a normal level, a casing arranged in said tank provided with an air inlet communicating with the bowl substantially at the outlet from the tank into said bowl, and having a discharge outlet, a fan arranged in said casing, means for admitting water to operate said fan, means for discharging the spent water into the tank after it has driven said fan, a valve arranged to control the discharge of water from the flushing tank into said bowl, means for operating said valve, and means for automatically controlling said valve whereby a measured quantity is discharged from the tank into the bowl upon the manual opening of said valve.

9. In a device of the kind described and in combination, a toilet bowl, a flushing water storage tank provided with a water inlet and with a discharge outlet communicating with said bowl, a valve for controlling the admission of water into said flushing tank and a discharge valve arranged to control the discharge of water from the tank into said bowl, a fan casing communicating with said bowl through said outlet from said tank and provided with a discharge port, a fan arranged in said casing, means for conducting water to said fan casing to operate said fan, said casing arranged to discharge the spent water into said tank after its operation of said fan, manually operated means for opening said discharge valve as desired, float controlled means for operating said intake valve, and means coöperating with said float controlled means and said discharge valve whereby a measured quantity of water may be discharged from the flushing tank regardless of the amount of water discharged into the tank from said fan casing and an amount of water admitted to the flushing tank to replace the discharged water sufficient to maintain a normal level in the tank between the successive operations of said fan, and means whereby the fan will be automatically operated on said seat being occupied.

10. In a device of the kind described and in combination, a closet bowl and seat therefor, a water tank provided with a discharge outlet in the bottom, a flush pipe extending therefrom and communicating with said bowl, an intake pipe, a tubular valve for said outlet and a valve for said inlet, means for normally controlling said outlet valve, means operable by the water in the tank for automatically controlling said inlet valve, a conduit projecting within the tank and depending a distance beyond the normal water level in the tank, said tubular valve open at its upper end and projecting up into said conduit, and constituting an overflow and air conduit communicating with the flush pipe, a fan arranged in said conduit and provided with water actuated means for driving the same, a water pipe extending from said intake pipe to said means, a valve for controlling the passage of water through said pipe, said conduit constructed to permit the spent water to discharge into said tank after it has operated the fan, and means coöperating with the toilet seat for automatically controlling said last mentioned valve.

11. In a device of the kind described and in combination, a closet bowl, a water tank provided with a discharge outlet in the bottom, a flush pipe extending therefrom and communicating with said bowl, an intake pipe, a tubular valve for said outlet and a valve for said inlet, means for normally controlling said outlet valve, means operable by the water in the tank for automatically controlling said inlet valve, a conduit projecting within the tank and depending a distance beyond the normal water level in the tank, said tubular valve open at its upper end and projecting up into said conduit, and constituting an overflow and air conduit communicating with the flush pipe, a fan arranged in said conduit and provided with water actuated means for driving the same, a water pipe extending from said intake pipe to said means, a valve for controlling the passage of water through said pipe, said conduit constructed to permit the spent water to discharge into said tank after it has operated said fan, and mechanism arranged between the controlling means for said inlet and outlet valves for automatically controlling the valves, whereby the intake and outlet valves are controlled in a predetermined manner.

In testimony whereof, we have hereunto signed our names in the presence of two subscribing witnesses.

CARL A. KRANTZ.
GUSTAVUS E. KRANTZ.

Witnesses:
Roy W. Hill,
Charles I. Cobb.